May 15, 1956 R. C. ZEIDLER 2,745,352
HYDRODYNAMIC COUPLING DEVICE
Filed Aug. 30, 1950 2 Sheets-Sheet 1
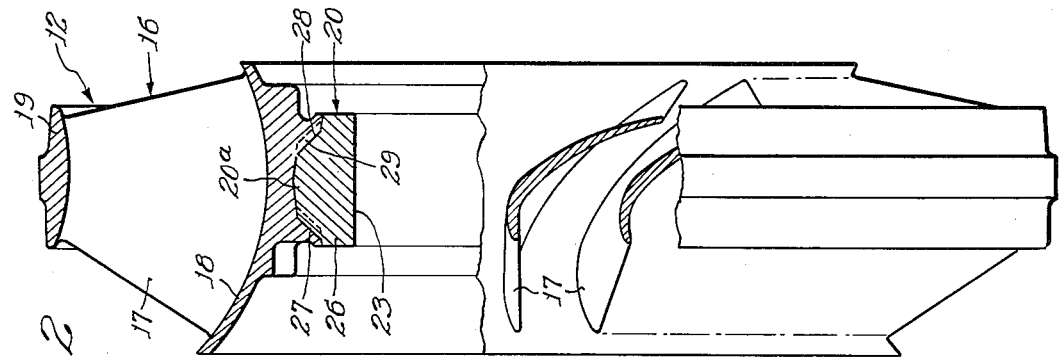
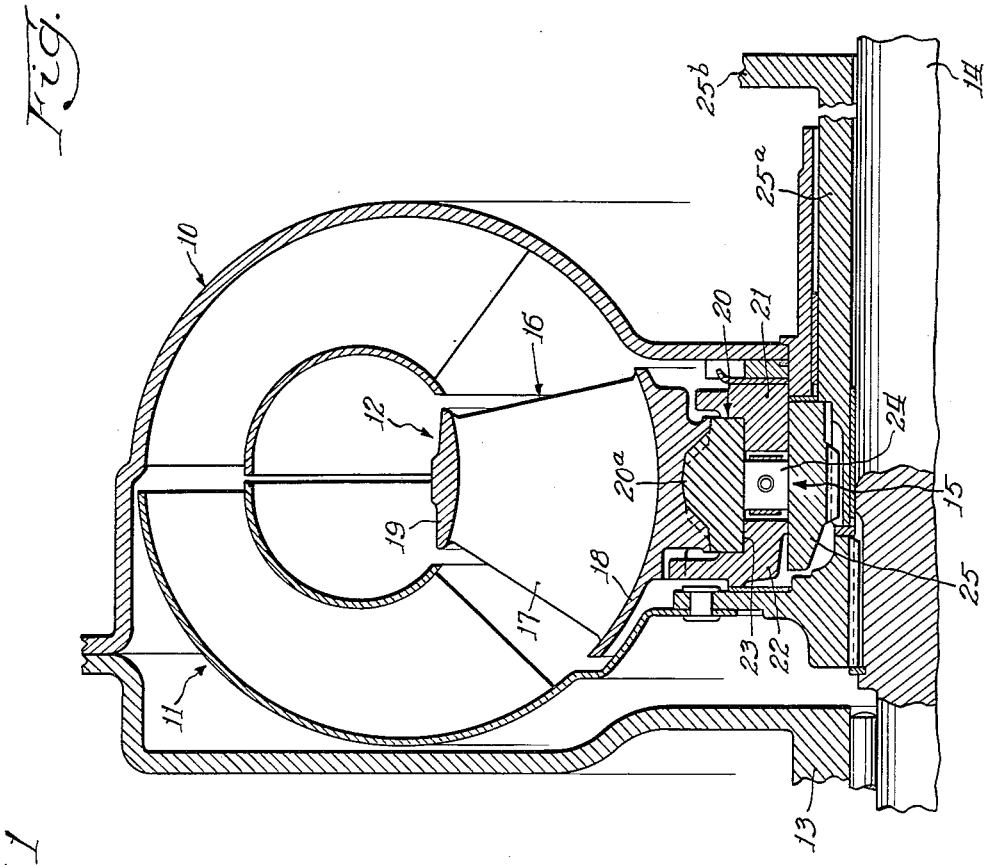
Inventor:
Reinhold C. Zeidler
By Edward C. Fitzhugh
Atty.

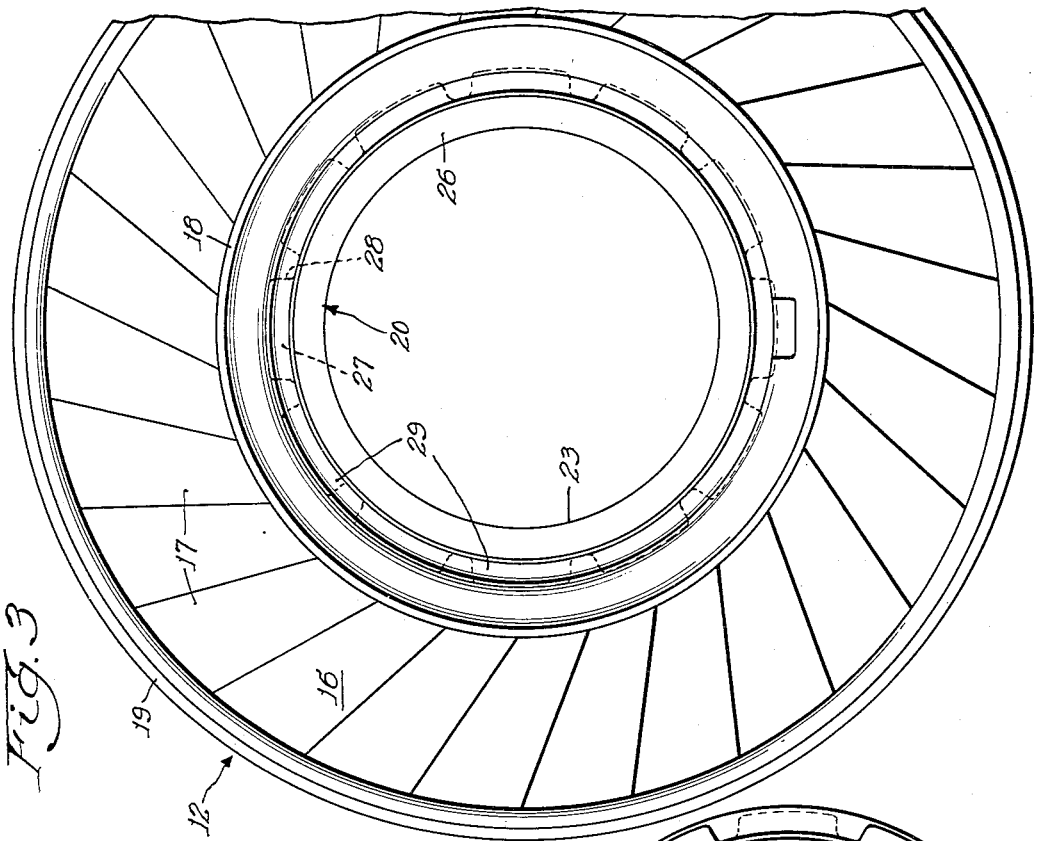

United States Patent Office 2,745,352
Patented May 15, 1956

2,745,352

HYDRODYNAMIC COUPLING DEVICE

Reinhold C. Zeidler, Detroit, Mich., assignor to Borg-Warner Corporation, Chicago, Ill., a corporation of Illinois Application August 30, 1950, Serial No. 182,301

5 Claims. (Cl. 103—115)

This invention relates to hydrodynamic coupling devices and, more particularly, to such coupling devices having vaned elements placed adjacent each other and operating by toroidal circulation of fluid in a closed toroidal circuit for transmitting torque between driving and driven members connected to respective of the vaned elements.

An object of the invention is the provision of an improved vaned element of the hydrodynamic coupling device, which vaned element is simple and rugged in construction, light in weight, and easy and inexpensive to fabricate.

Another object of the invention is to provide an improved vaned element of a hydrodynamic coupling device, the vaned element being of composite design or structure and comprising a vaned portion which is formed of light weight metal, such as aluminum, and a hub portion for association with a relatively movable member of the coupling device and formed of a metal, such as steel, adapted to withstand wear in the operation of the coupling device.

A more particular object of the invention is to provide an improved reaction member or stator structure of a hydrodynamic coupling device of the torque-multiplying type in which the vaned portion thereof is formed of aluminum and mechanically connected to an annular hub portion of steel rotatably mounting the stator element and adapted to cooperate with one-way brake structure conventionally used in hydrodynamic coupling devices of the torque-multiplying type.

These and other objects and features of the invention will become apparent from the following description taken together with the accompanying drawings, in which:

Fig. 1 is an axial section of a fragmentary portion, preferably the upper half of the impeller, turbine and stator elements of a hydrodynamic coupling device;

Fig. 2 is an enlarged sectional view of the stator element shown in Fig. 1;

Fig. 3 is a side elevation of the stator element shown in Fig. 2;

Fig. 4 is a side elevation of the hub member of the stator element shown in Figs. 1, 2 and 3; and Fig. 5 is a sectional view of the hub member shown in Fig. 4.

Referring now to Fig. 1 of the drawings, the illustrated hydrodynamic coupling device is of the torque-multiplying type and comprises a fluid impeller or driving element 10, a turbine or driven element 11, and a stator or reaction element 12. The hydrodynamic coupling device functions to multiply torque between an input member 13 and an output member 14 respectively secured to the impeller 10 and turbine 11, the vanes of the impeller 10 imparting energy to a body of fluid within the coupling device and the turbine element 11 receiving the energy from the fluid, the stator being held from rotation by a one-way brake 15 to provide multiplication of torque by the hydrodynamic coupling device. As is well known in the art, changes in the directions of the fluid flowing from the turbine to the reaction member during decreasing torque-multiplying stages of the coupling device will eventually effect rotation of the reaction member with the impeller and turbine, i. e., upon the fluid striking the backs of the vanes of the stator, the one-way brake will release the stator for rotation.

The present invention is directed primarily to the structure of the stator or reaction member. The stator element comprises a vaned portion 16 provided by a plurality of vanes 17, an arcuate supporting portion 18 and an annular shroud or core ring 19, the vanes connecting the supporting member 18 and the core ring 19. The stator element also comprises a hub portion 20 rotatably supported on two L-section bearing members 21 and 22 in the form of annular rings and between which is disposed the one-way brake 15, which may be of the sprag type as shown, the hub portion 20 of the stator element having an internal surface 23 providing bearing surfaces engaging the rings 21 and 22 and also an outer annular raceway for engagement with the sprags 24 of the one-way brake, there being an annular inner raceway 25 splined to a sleeve 25a which is fixed to a part 25b of a stationary casing.

It is desirable in the fabrication of vaned elements of hydrodynamic coupling devices that the relatively rotatable elements be formed of some light weight material to minimize centrifugal forces arising at operating speeds, such material may be of light sheet metal, such as steel, as exemplified in the impeller and turbine construction in Fig. 1, or such as aluminum, which forms the material of the stator element and, more particularly, the vaned portion 16 thereof including the vanes 17, the supporting member 18 and the core ring 19. Such materials provide for the ready and economical manufacture of these vaned elements while having other advantages, such, for example, for readily forming the vanes with intricate curvatures required for obtaining an initial maximum torque-multiplying ratio, and thereafter a decreasing torque-multiplying ratio throughout the torque conversion range of the hydraulic torque converter. It is well known in the art that casting methods can be used to satisfactorily provide vaned elements, as evidenced by the conventional formation of such vaned elements by casting aluminum by die-casting, or by use of plaster or sand molds. While aluminum is advantageous due to its light weight and ready casting to a desired form, it will wear rapidly when subject to slight friction. Accordingly, if an aluminum vaned element has its hub providing a bearing surface rotatably mounting the element, or in the case of a stator formed of aluminum having a hub rotatably mounted on bearings and subject to the gripping effort of one-way brake sprag elements, the bearing surfaces will wear rapidly and may become distorted.

The present invention is designed to satisfactorily provide a solution to this problem in the art by forming the vaned portion of the coupling element of aluminum and the hub portion of the coupling element of steel, and mechanically interlocking the aluminum vaned portion with the steel hub. Such coupling element construction is shown in Fig. 1, wherein the steel hub portion 20 has its bearing surface 23 rotatably mounting the stator element on the bearing elements 21 and 22 and with which surface 23 the one-way clutch elements, such as the sprags 24 can be repeatedly engaged, with slight wear to the surface 23 of the hub portion 20. More particularly and referring to Figs. 2, 4 and 5, the steel hub member 20 is substantially T-shaped in cross-section, with the vertical leg portion 20a of the T-shape member being somewhat pyramidal in shape, extending radially outward of the horizontal cross portion 26 and having sides converging toward the radially outer extremity of the ring, a plurality of projections or lugs 27 extending outwardly from the converging sides of the member, the projections 27 being circumferentially spaced from each other and with the sets of projections 27 at one side of the leg portion 20a being in circumferentially staggered relation to the projections 27 on the other side of the leg portion 20a. The annular steel hub member is then positioned within plaster or sand molds having cavities conforming to the shape of the aluminum supporting member 18, vanes 17 and core ring 19 of the vaned portion 16 of the stator, and thereafter molten aluminum is poured into the plaster or sand molds and allowed to cool to form the assembled stator. It will be apparent that as the molten aluminum flows into the mold cavities that the aluminum will flow about the vertical leg portion 20a of the steel hub ring 20 and into the spaces 28 between the projections 27 on the steel hub ring, with the result that, upon cooling the metal, a plurality of projections identified at 29 in Figs. 2 and 3 on the aluminum supporting portion 18 will be located within the spaces or recesses 28 between the projections of the hub member to securely interlock the hub portion 20 and the vaned portion 16 of the stator.

From the foregoing description, it will be apparent that I have provided an improved vaned element of a hydrodynamic coupling. It is within the contemplation of my invention that the reaction member or stator element fabricated structure illustrates a typical embodiment of the invention and that the invention can also be applied to other vaned elements having the vanes and member, supporting the vanes, made of aluminum, and having a hub portion mechanically interlocked with the vane-supporting member, the hub portion being made of steel or other metal highly resistant to wear, and providing a bearing surface for rotatably supporting the vaned element on a relatively rotatable member, such as a transmission shaft. The invention, therefore, is not to be limited to the embodiment of the invention illustrated and described but only as limited by the appended claims.

I claim:

1. In a vaned element of a hydrodynamic coupling device, the combination of a vaned portion comprising an annular supporting member and a plurality of generally radial vanes extending outwardly therefrom, said vaned portion being formed of metal having low wear resistance properties; and an annular hub portion within said annular supporting member and having an internal bearing surface, said hub portion being formed of metal having high wear resistance properties; and means mechanically interlocking said supporting member and said hub portion, said means comprising sets of circumferentially spaced projections extending radially outwardly of said hub portion on opposite sides thereof received within recesses in said supporting member, the projections of one set being in circumferentially staggered relation to the projections of the other set.

2. In a vaned element of a hydrodynamic coupling device, the combination of an annular vaned portion having an internal groove extending circumferentially thereof, said vaned portion being formed of metal having low wear resistance properties, and an annular hub portion within said vaned portion and having a rib extending circumferentially thereof and within said groove of said vaned portion to prevent relative axial movement of said vaned portion and said hub portion, said hub portion being formed of metal having high wear resistance properties; and interengaging means on the sides of said rib and on the sides defining the groove in said vaned portion for interlocking said vaned and hub portions to prevent relative rotation of said vaned portion and said hub portion.

3. In a vaned element of a hydrodynamic coupling device, the combination of an annular vaned portion and an annular hub portion within said vaned portion, one of the adjacent parts of said vaned and hub portions having a groove therein extending circumferentially thereof and the other of the adjacent parts of said portions having a rib extending circumferentially thereof and received within said groove, and interengaging means on the sides of said rib and on the sides defining the groove in said one part for interlocking said vaned and hub portions.

4. In a vaned element of a hydrodynamic coupling device, the combination of an aluminum vaned portion comprising an annular supporting member having an arcuate outer part extending generally axially of said member, and a base part extending inwardly of said arcuate outer part and having an annular groove therein, each side of said groove being defined by alternately circumferentially spaced lugs and recesses; and an annular steel hub portion of T-shaped section, the cross-member of the T having an internal bearing surface, and the leg of the T providing an annular rib projecting within the groove in said base part of said annular member of said vaned portion and having alternately circumferentially spaced lugs and recesses on each side thereof, the lugs of said rib of said hub portion being received within the recesses in the sides of said groove in said base part of said annular member of said vaned portion and the lugs on the sides of said groove in said base part of said supporting member of said vaned portion being received within the recesses in the rib of said hub portion, to maintain said vaned and hub portions in assembly and to prevent relative movement thereof.

5. In a vaned element of a hydrodynamic coupling device, the combination of a vaned portion comprising an annular supporting member having an arcuate outer part extending generally axially of said member, and a base part extending inwardly of said arcuate outer part and having an annular groove therein, each side of said groove being defined by alternately circumferentially spaced lugs and recesses; and an annular hub portion of T-shaped section, the cross-member of the T having an internal surface, and the leg of the T providing an annular rib projecting within the groove in said base part of said annular member of said vaned portion and having alternately circumferentially spaced lugs and recesses on each side thereof, the lugs of said rib of said hub portion being received within the recesses in the sides of said groove in said base part of said annular member of said vaned portion and the lugs on the sides of said groove in said base part of said supporting member of said vaned portion being received within the recesses in the rib of said hub portion, to maintain said vaned and hub portions in assembly and to prevent relative movement thereof.

References Cited in the file of this patent
UNITED STATES PATENTS

| | | |
|---|---|---|
| 1,323,533 | Hurt | Dec. 2, 1919 |
| 1,876,518 | Mathis | Sept. 6, 1932 |
| 1,890,226 | Mathis | Dec. 6, 1932 |
| 2,336,231 | Dodge | Dec. 7, 1943 |
| 2,387,722 | Dodge | Oct. 30, 1945 |
| 2,405,284 | Birmann | Aug. 6, 1946 |
| 2,438,867 | Rockwell et al. | Mar. 30, 1948 |
| 2,542,251 | Hueglin | Feb. 20, 1951 |
| 2,598,620 | Swift | May 27, 1952 |
| 2,613,609 | Buchi | Oct. 14, 1952 |